United States Patent Office 3,806,485
Patented Apr. 23, 1974

3,806,485
STABLE LIQUID DISPERSIONS OF WATER SOLUBLE POLYMERS AND PRODUCTS PRODUCED THEREFROM
Alvin J. Frisque, La Grange, Ill., assignor to
Nalco Chemical Company, Chicago, Ill.
No Drawing. Filed Nov. 18, 1971, Ser. No. 200,173
Int. Cl. C08f 47/20
U.S. Cl. 260—29.6 NR                    5 Claims

ABSTRACT OF THE DISCLOSURE

A stable liquid dispersion of a water soluble anionic vinyl addition polymer and a water soluble cationic polymer is disclosed. Also described are novel gel-like structures prepared from these dispersions.

INTRODUCTION

Many attempts have been made to prepare solutions which contain both water soluble anionic and cationic polymers. Due to the different charges on these molecules, precipitation due to ionic reactions always occur. If it were possible to prepare liquid compositions which contained both anionic and cationic polymers, many useful effects could be achieved by using these liquid compositions in a variety of industrial applications.

THE INVENTION

This invention relates to stable liquid dispersions of a water soluble anionic vinyl addition polymer and a water soluble cationic polymer. The water soluble anionic vinyl addition polymer is in the form of a water-in-oil emulsion which contains dispersed therein the finely-divided water soluble anionic vinyl addition polymer. This latex contains uniformily distributed therethroughout a water soluble cationic polymer. The water soluble anionic vinyl addition polymers that are used in the practice of the invention may be illustrated by the following list of polymers.

TABLE I

Number: Name
1 _____ Polyacrylic acid-sodium salt.
2 _____ Polymethacrylic acid-sodium salt.
3 _____ Maleic anhydride-vinyl acetate copolymer.
4 _____ Polyvinyl methyl ether-maleic anhydride copolymer.
5 _____ Methacrylic acid-acrylamide copolymer.
6 _____ Polyacrylic acid.
7 _____ Isopropenyl acetate-maleic anhydride sodium salt.
8 _____ Itaconic acid-vinyl acetate.
9 _____ Methyl styrene-maleic anhydride sodium salt.
10 _____ Styrene-maleic anhydride.
11 _____ Methylmethacrylate-maleic anhydride sodium salt.
12 _____ Acrylic acid-styrene.
13 _____ Acrylamide-acrylic acid (5% by weight).
14 _____ Acrylamide-acrylic acid (50% by weight).
15 _____ Polystyrene sulfonic acid.
16 _____ Acrylamide-acrylic acid (80% by weight).

The above polymers may vary in molecular weight. They may be as low as 10,000 or as high as 12,000,000 or more. In many of the more useful applications, which will be more fully discussed hereafter, the molecular weight will be greater than 1,000,000.

The invention contemplates using as preferred water soluble anionic vinyl addition polymers the homo- and copolymers of acrylic acid as well as the water soluble salts thereof.

THE WATER SOLUBLE CATIONIC POLYMERS

These polymers also may be selected from a wide variety of known polymeric materials. Several of these polymers are listed below in Table II.

TABLE II

Number:                   Name
1 _____ Ethylene dichloride-ammonia condensation polymers.
2 _____ Tetraethylene pentamine-epichlorohydrin condensation polymers.
3 _____ Epichlorohydrin - ammonia condensation polymers.
4 _____ Polyethylene imine.
5 _____ Polydiallyl amine.
6 _____ Polydimethylamino ethyl methacrylate.
7 _____ The methyl chloride quaternary of number 1.
8 _____ The benzoyl chloride quaternary of number 6.
9 _____ Guanidine formaldehyde condensation polymers.
10 _____ Acrylamide - diallylamino copolymer (30%).

The above polymers are illustrative of typical water soluble cationic polymeric materials that may be used in the practices of the invention. A preferred class of these polymers may be described as alkylene polyamines which are illustrated by polymers 1, 2, 3, 4, 5 and 8 above.

Many of the above polymers have been described with respect to the reactants from which they are prepared. A detailed discussion of the above polymers and other cationic polymers appears in Canadian Pat. No. 631,212, the disclosure of which is incorporated herein by reference. The polymers may be employed as solutions or in the form of a water-in-oil latex emulsion. When the polymers are of the vinyl addition type copolymers may be formed with other ethylenically unsaturated monomers. Such copolymers should contain at least 5% by weight of the cationic monomer.

THE ANIONIC VINYL ADDITION POLYMER POLYMERIC LATEX

The invention contemplates utilizing the water soluble anionic vinyl addition polymers in the form of water-in-oil emulsion which contains dispersed therein the water soluble anionic vinyl addition polymer. Emulsions of this type are prepared by dispersing the anionic vinyl addition polymer into a water-in-oil emulsion. These polymers are produced by most manufacturing processes are in the form of powders or lump-like agglomerates of varying particle size. It is desirable that the particles, before being placed into the emulsion, be comminuted by grinding, abrading or the like so that their average particle size is less than 5 millimeters and preferably is within the range of 1–5 microns. After the powders have been comminuted, they may be dispersed into the water-in-oil emulsion by means of agitation provided by such devices as stirrers, shakers and the like. To be commercially practical, the amount of polymer in the emulsion should be at least 2% by weight. The invention contemplates using emulsions containing between 5–75% by weight with preferred emulsions having a polymer concentration within the range of 10–45% by weight. In some cases the starting emulsions are converted to suspensions due to the nature and the amount of the polymer present therein.

From a commercial standpoint it is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce particle sizes within these limitations, spray dryers with appropriate size nozzles may be used. It also is possible to prepare the polymer-containing emulsion of the water soluble vinyl addition polymers directly from the vinyl monomers from which these polymers are synthesized. Such polymer-containing emulsions may be synthesized by using the water-in-oil emulsion polymerization technique set forth in U.S. Pat. 3,284,393. The teachings of this patent comprise forming a water-in-oil emulsion of water soluble ethylenic unsaturated monomers. The emulsion is formed by utilizing a water-in-oil emulsifying agent. To this monomer is added a free radical-type polymerization catalyst and then heat is applied under free radical-forming conditions to form water soluble polymer latices. The polymeric latices produced by this patent are relatively unstable and frequently must be treated with additional emulsifiers to render the products stable.

The water-in-oil emulsions used to prepare the above polymers may be formulated by any number of known techniques.

The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil & Refining Company under the trade name "Isopar M." Typical specifications of this narrow-cut isoparaffinic solvent are set forth below in Table III.

TABLE III

| Specification properties | Minimum | Maximum | Test method |
| --- | --- | --- | --- |
| Gravity, API at 60/60° F | 48.0 | 51.0 | ASTM D 287 |
| Color, Saybolt | 30 | | ASTM D 156 |
| Aniline point, ° F | 185 | | ASTM D 611 |
| Sulfur, p.p.m | | 10 | ASTM D 1266 [1] |
| Distillation, ° F.: | | | |
| IBP | 400 | 410 | } ASTM D 86 |
| Dry point | | 495 | |
| Flash point, ° F.[2] | 160 | | ASTM D 93 |

[1] Nephelometric mod.  [2] Pensky-Martens closed cup.

The amount of oil used in relation to the water to prepare the emulsion may be varied over wide ranges. As a general rule, the amount of oil-to-water may vary between 5:1–1:10 with preferable emulsions being prepared in the ratio of 1:2 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that the emulsion be a stable emulsion and to achieve this end it is often necessary to employ an oil soluble emulsifying agent. The amount of emulsifying agent to provide an emulsion will have to be determined by routine experimentation. As a general rule it may be said that the amount of oil soluble emulsifier may range from 0.1 to 30% by weight based on the weight of the oil. To produce stable emulsions the amount of emulsifier will normally be within the range of 12–20% by weight of the oil.

Rather than provide a listing of suitable emulsifiers, recommended as being satisfactory are the so-called low HLB materials which are well documented in the literature and are summarized in the Atlas HLB Surfactant Selector. Although these emulsifiers are useful in producing good water-in-oil emulsions, other surfactants may be used as long as they are capable of producing these emulsions. For instance, we have found that certain high HLB surfactants are capable of producing stable water-in-oil emulsions. A typical low HLB emulsifier is sorbitan monooleate.

PREPARATION OF THE STABLE LIQUID DISPERSIONS

Once latices containing the water soluble anionic vinyl addition polymers are prepared the water soluble cationic polymers are combined therewith by the utilization of conventional mixing techniques. Preferably the water soluble cationic polymers are in the form of aqueous solutions which contain 5–40% by weight of the polymer and are added to the polymeric latex. Alternatively, they may be nearly water-free. After uniformly mixing the two components there results a stable liquid dispersion of a water soluble anionic vinyl addition polymer and a water soluble cationic polymer. The proportions of the two polymers may be varied to a considerable degree. For instance, the ratio of the water soluble anionic vinyl addition polymer to water soluble cationic polymer may vary between 1:10–10:1 on a weight basis. A preferred ratio is 1:5 to 5:1. The most preferred ratio is 1:2–2:1.

The amount of the water soluble vinyl addition polymers plus the water soluble cationic polymers present in the finished liquid dispersion may be varied over a wide range of concentrations, e.g. dispersions containing from 0.001% to 75% by weight are useful, although for most applications the total weight of the two polymers contained in the dispersion will be within the range of 5%–40% by weight, with a very beneficial dispersion being one which contains between 10–30% by weight of the two polymers.

The finished dispersions are stable at room temperature for periods of time ranging between several days to as long as six months since they may be prepared over a wide variety of concentrations. Concentrates containing large amounts of polymers may be prepared and shipped to a use point and then diluted with an organic liquid just prior to use.

PREPARATION OF THE LIQUID DISPERSIONS

To illustrate the preparation of liquid dispersions a variety of emulsions were prepared containing different water soluble anionic vinyl addition polymers. These emulsions are set forth below in Table IV.

TABLE IV

| Composition number | Percent by weight | | Polymer | Percent in emulsion | Polymer particle size range (microns) |
| --- | --- | --- | --- | --- | --- |
| | Water | Oil | | | |
| I | 72 | 28 (I) | {93% acrylamide / 7% methacrylic acid} | 35 | 0.05–7.0 |
| II | 72 | 28 (I) | {39% acrylamide / 7% methacrylic acid} | 35 | 0.05–7.0 |
| III | 72 | 28 (T) | {70% acrylamide / 30% acrylic acid} | 35 | 0.05–7.0 |
| IV | 67 | 33 (I) | {93% acrylamide / 7% methacrylic acid} | 32 | ≤30 |
| V | 70 | 30 (I) | {70% acrylamide / 30% acrylic acid} | 34 | .01–10 |
| VI | 71 | 29 (I) | Sodium polyacrylate | 37 | ([1]) |

[1] Less than 1 millimeter.

NOTE.—I=Isopar M; T=Toluene.

DISPERSION A

To illustrate the preparation of liquid dispersions a there was added 30% by weight of an aqueous dispersion containing 23% by weight of an alkylene polyamine prepared from the condensation of ethylene dichloride and ammonia. The polymer was prepared using the technique set forth in Canadian Pat. No. 785,829.

DISPERSION B

To composition number VI in Table IV there was added an aqueous dispersion which contained 25% by weight of an ammonia ethylene dichloride polymer of the type used in dispersion A above with the exception it had been quaternized with methyl chloride.

To illustrate other novel dispersions of the invention Table V is presented below:

TABLE V

| Anionic latex Table IV | Percent by wt. | Cationic polymer | Percent by wt. |
|---|---|---|---|
| I | 60 | 20% solution of a tetraethylene pentamine epichlorohydrin reaction product (Canadian Pat. 731,212). | 40 |
| VI | 50 | Ethylenediamine | 10 |
| V | 70 | 75% acrylamide, 25% dimethylamino ethyl methacrylate copolymer in the form of a latex (water-in-oil—see Table II, U.S. 3,624,019). | 30 |

All of the above dispersions were stable and were capable of being stored under a variety of conditions without inter-reaction of the two polymers.

INVERSIONS OF THE STABLE LIQUID DISPERSIONS

One of the most interesting phenomena that occurs in working with the above described stable liquid dispersions is the fact that under certain conditions the emulsion which contains dispersed therein the finely-divided water soluble anionic vinyl addition polymers may be inverted.

The water soluble anionic vinyl addition polymer-containing emulsions may be inverted by any number of means. The most convenient resides in the use of a surfactant added to either the polymer-containing emulsion or to the water into which it is to be dissolved. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50% based on polymer. Good inversion often occurs within the range of 1.0–10% based on polymer.

The preferred surfactants are hydrophilic and are further characterized as being water soluble. Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyd or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide.

Any anionic, cationic, or nonionic compound can be used as the surfactant.

In addition to using the water soluble surfactants described above, other materials may be used, such as silicones, clays and the like; in certain instances, they tend to invert the emulsion even though they are not water soluble.

In other specific cases the surfactant may be directly added to the polymer-containing emulsion; thereby rendering it self-inverting upon contact with water. These products, while capable of being used in certain systems, must be carefully formulated since the surfactants may tend to interact with the emulsifier or the emulsion and destroy it prior to its being used.

The emulsions may be inverted by treating them with aqueous solutions of alkaline materials such as solutions of sodium hydroxide, ammonia, amines, sodium aluminate or the like.

Other techniques for inverting the emulsions include the use of agitation, high voltage electrical fields, heat and pH shift, as well as the placement into the water, into which the polymer-containing emulsion is to be dissolved, certain electrolytes. For any particular polymer-containing emulsion a suitable method for its inversion may be readily determined by routine experimentation.

THE GEL-LIKE STRUCTURES

When the above polymers are thus inverted the anionic vinyl addition polymer instantly reacts with the cationic polymer to produce within a matter of minutes a reaction product which may be described as a three-dimensional, water and hydrocarbon liquid insoluble gel-like structure, which is composed of what is believed to be ionically combined intimate admixture of the two polymers. These gel-like structures are spongy, porous, and are substantially incapable of adherence to most hydrophobic surfaces. They may be prepared from dilute solutions of the liquid dispersions in the form of films which may be cast on such surfaces as glass, metals, or they may be formed on to other substrates such as a wide variety of fibers such as cloth, paper and the like.

They can be formed into suitable coatings for the protection of a variety of surfaces against the attack of many chemical substances. Since their formation can be controlled by varying the inversion technique it is possible to form, in situ, preservative coatings on to a variety of surfaces such as pipes, vessels, wood and the like.

EXAMPLES

To illustrate the typical gel-like structures, 20 parts by weight of dispersion A were added to water which contained 3% by weight of sodium hydroxide. The water was contained in a pint mason jar. After the addition of the liquid dispersion to the water-sodium hydroxide solution the jar was capped and shaken for 3 minutes. At the end of this time the cap was removed. The contents of the jar contained an opaque rubber-like gel that was insoluble in water and in the most common organic solvents, e.g. pentane, methanol, xylene and the like. The gel was removed from the jar and allowed to air dry for three days. At the end of this time the structure became more rubbery and had shrunken considerably in size due to loss of liquid. It was still semi-flexible and was difficult to pull apart.

Dispersion B was inverted identically to dispersion A described above except that a surfactant was used as the invertant. Prior to set-up the mixture was roller coated on to a sheet of glass and a piece of cotton cloth. After setting the produced film was washed with pentane to remove the organic solvent. The films produced on both the glass and the cotton cloth rendered the surfaces resistant to oil staining.

It is believed that the gel-like structures are formed when the isoelectric point of the inverted water soluble anionic vinyl addition polymer and the water soluble cationic polymer is reached. The exact amount of either polymer to effectively neutralize one another is difficult to determine. When the ratios of either ingredient exceed the amount needed to exactly neutralize the other polymer substantial quantities of the excess polymer are believed to be entrapped by the gel-like structure. Thus, by varying excesses of the anionic or cationic polymer it is possible to produce a neutral gel-like structure which has entrained within its interstices excesses of polymeric material that will impart to the gel-like structure either an anionic or cationic charge. This effect allows the structures to be coated or adherently bonded to many hydrophilic surfaces by means of ionic or polar attractive forces.

The gel-like structures can be dried and used as ion exchange resins (ion retardation type). They also may be used to produce permeable dialysis films.

In preparing the porous gel-like structures from the liquid dispersions of the invention it is possible to add other chemicals to the dispersion just prior to or at the time of inversion. When such a technique is used it is possible to entrap many chemicals within the gel-like structure which would be released under certain circumstances. For instance, slow release of corrosion inhibitors, bactericides, herbicides, and the like may be prepared.

Having thus described my invention, I claim:

1. A stable liquid dispersion of a water soluble polyanionic vinyl addition polymer and a water soluble polycationic polymer comprising:
   (A) a polymeric latex composed of a water-in-oil emulsion which contains dispersed therein a finely-divided water soluble polyanionic vinyl addition polymer, said polymeric latex having uniformly distributed therethroughout;
   (B) a water soluble polycationic polymer;
   with the weight ratio of (A) to (B) being within the range of 1:10 to 10:1 and the total amount of (A) plus (B) present within said dispersion being within the range of from 0.001% to 75% by weight, both of said polymers being present in the aqueous phase.

2. The stable liquid dispersion of claim 1 where the weight ratio of (A) to (B) is within the range of from 1:5 to 5:1 and the amount of (A) plus (B) present within said dispersion is within the range of from 5% to 40% by weight.

3. The stable liquid dispersion of claim 1 where the weight ratio of (A) to (B) is within the range of from 1:2 to 2:1 and the amount of (A) plus (B) present within said dispersion is within the range of from 10% to 30% by weight.

4. A stable liquid dispersion of a polyacrylic acid and water soluble salts thereof and a water soluble cationic polymer comprising:
   (A) a polymeric latex composed of a water-in-oil emulsion which contains dispersed therein a finely-divided polyacrylic acid or a water soluble salt thereof, said polymeric latex having uniformly distributed therethroughout;
   (B) a water soluble alkylene polyamine polymer;
with the weight ratio of (A) to (B) being within the range of 1:10 to 10:1 and the total amount of (A) plus (B) present within said dispersion being within the range of from 0.001% to 75% by weight, said polyacrylic acid and said alkylene polyamine polymer both being present in the aqueous phase.

5. A stable liquid dispersion of a water soluble polyanionic vinyl addition polymer and a water soluble polycationic polymer comprising:
   (A) a polymeric latex comprised of a water-in-oil emulsion which contains dispersed therein a finely-divided water soluble polyanionic vinyl addition polymer, said polymeric latex havig uniformly distributed therethroughout;
   (B) a water soluble polycationic polymer which is in the form of a polymeric later composed of a water-in-oil emulsion which contains dispersed therein a finely-divided water soluble polycationic vinyl addition polymer;
with the weight ratio of (A) to (B) being within the range of 1:10 to 10:1 and the total amount of (A) plus (B) present within said dispersion being within the range of from 0.001% to 75% by weight, both said polyanionic polymer and said polycationic polymer being present in the aqueous phase.

References Cited

UNITED STATES PATENTS

| | | | |
|---|---|---|---|
| 2,832,746 | 4/1958 | Jackson | 260—45.5 |
| 3,271,496 | 9/1966 | Michaels | 264—232 |
| 3,284,393 | 11/1966 | Vanderhoff et al. | 260—29.6 |
| 3,321,432 | 5/1967 | Strasser et al. | 260—29.7 |
| 3,467,604 | 9/1969 | Michaels | 260—2.5 |
| 3,660,338 | 5/1972 | Economou | 260—29.6 NR |
| 3,691,124 | 9/1972 | Barron | 260—29.6 WB |
| 3,692,724 | 9/1972 | Van Dyk | 260—29.6 NR |

OTHER REFERENCES

Becher: "Emulsions: Theory and Practice," p. 85, Reinhold, 1957.

HAROLD D. ANDERSON, Primary Examiner

E. A. NIELSEN, Assistant Examiner

U.S. Cl. X.R.

260—29.4 VA. 29.6 WB. 29.6 WQ

UNITED STATES PATENT OFFICE
CERTIFICATE OF CORRECTION

Patent No. 3,806,485        Dated April 23, 1974

Inventor(s) ALVIN J. FRISQUE

It is certified that error appears in the above-identified patent and that said Letters Patent are hereby corrected as shown below:

Column 2, line 37 for "631,212" read --731,212--; Column 2, line 55 for "are" read --as--; Column 4, lines 74 & 75, and Column 5, lines 1-4 should read --To emulsion in TABLE IV, COMPOSITION NUMBER VI, there was added 30% by weight of an aqueous dispersion containing 23% by weight of an alkylene polyamine prepared from the condensation of ethylene dichloride and ammonia.--; Column 8, line 13 for "havig" read --having--; Column 8, line 16 for "later" read --latex--.

Signed and sealed this 11th day of March 1975.

(SEAL)
Attest:

RUTH C. MASON
Attesting Officer

C. MARSHALL DANN
Commissioner of Patents
and Trademarks